(12) United States Patent
Starmans et al.

(10) Patent No.: US 11,344,158 B2
(45) Date of Patent: May 31, 2022

(54) FOOD PROCESSING APPARATUS

(71) Applicant: KONINKLIJKE PHILIPS N.V., Eindhoven (NL)

(72) Inventors: Franciscus Jozef Marie Starmans, Ebenthal (AT); Bernhard Schratter, Klagenfurt (AT); Philipp Smole, Klagenfurt (AT); Dieter Johann Maier, Klagenfurt (AT); Mirko Cartei, Hong Kong (HK)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/605,315

(22) PCT Filed: Mar. 19, 2019

(86) PCT No.: PCT/EP2019/056232
§ 371 (c)(1),
(2) Date: Oct. 15, 2019

(87) PCT Pub. No.: WO2019/179839
PCT Pub. Date: Sep. 26, 2019

(65) Prior Publication Data
US 2021/0045582 A1   Feb. 18, 2021

(30) Foreign Application Priority Data
Mar. 22, 2018 (EP) .................................. 18163427

(51) Int. Cl.
*A47J 43/07* (2006.01)

(52) U.S. Cl.
CPC ................................ *A47J 43/0716* (2013.01)

(58) Field of Classification Search
CPC ................................................... A47J 43/0716
(Continued)

(56) References Cited

U.S. PATENT DOCUMENTS 1,601,572 A * 9/1926 Lester .................. A47G 21/145
248/37.3
1,987,388 A * 1/1935 Cretors .................... A23L 7/187
99/323.9

(Continued)

FOREIGN PATENT DOCUMENTS

| EP | 2944239 | 11/2015 |
| WO | 2017/051424 | 3/2017 |
| WO | 2018/019620 | 2/2018 |

OTHER PUBLICATIONS

International Search Report and Written Opinion dated Jun. 5, 2019 for International Application No. PCT/EP2019/056232 Filed Mar. 13, 2019.

(Continued)

*Primary Examiner* — David L Sorkin
(74) *Attorney, Agent, or Firm* — Schott, P.C.

(57) ABSTRACT

There is provided a food processing apparatus (100) for use with a near-infrared light source and a sensor. The apparatus comprises a food processing chamber (110) configured to receive a food stuff, a food processing unit (120) configured to process the food stuff in the food processing chamber, and an optical component (130) configured to reflect emitted near-infrared light from the near-infrared light source towards the sensor, wherein the optical component is arranged at the food processing unit or a channel formed in the food processing chamber.

17 Claims, 8 Drawing Sheets

(58) Field of Classification Search
USPC .................................. 366/142, 205, 314
See application file for complete search history.

(56) References Cited

U.S. PATENT DOCUMENTS

| | | | | |
|---|---|---|---|---|
| RE20,024 E * | 6/1936 | Kohler | ................... | A23N 12/08 |
| | | | | 219/214 |
| 2,057,421 A * | 10/1936 | Dickson | ................ | A47J 37/041 |
| | | | | 99/353 |
| 2,810,958 A * | 10/1957 | Monti | .................... | A47G 21/04 |
| | | | | 30/327 |
| 4,470,369 A * | 9/1984 | Edgerton | ............. | H05B 3/0047 |
| | | | | 118/723 R |
| 5,048,402 A * | 9/1991 | Letournel | .............. | A21B 7/005 |
| | | | | 99/348 |
| 5,050,490 A * | 9/1991 | Yahav | ..................... | A47J 27/14 |
| | | | | 99/348 |
| 9,536,449 B2 | 1/2017 | Connor | | |
| 2001/0034175 A1 * | 10/2001 | Miyazaki | ................. | H01J 9/46 |
| | | | | 445/25 |
| 2002/0050774 A1 * | 5/2002 | Goto | ....................... | H01J 61/12 |
| | | | | 313/113 |
| 2010/0125418 A1 | 5/2010 | Hyde | | |
| 2013/0045473 A1 * | 2/2013 | Duerr | ................ | B01F 15/00155 |
| | | | | 435/3 |
| 2015/0374175 A1 * | 12/2015 | Garr | .................... | B01F 13/0022 |
| | | | | 366/130 |
| 2016/0073820 A1 * | 3/2016 | Alet Vidal | ............. | H05B 3/685 |
| | | | | 99/337 |
| 2016/0350704 A1 | 12/2016 | Minvielle | | |

OTHER PUBLICATIONS

Givens, et al: "The principles, practices and some future applications of near infrared spectroscopy for predicting the nutritive value of foods for animals and humans" Nutrition Research Reviews (1997). 10, 83-1 14.

Foley, et al: "Ecological applications of near infrared reflectance spectroscopy—a tool for rapid, cost-effective prediction of the composition of plant and animal tissues and aspects of animal performance" Oecologia (1998).

* cited by examiner

FOOD PROCESSING APPARATUS

CROSS REFERENCE TO RELATED APPLICATIONS

This application is the U.S. National Phase application under 35 U.S.C. § 371 of International Application No. PCT/EP2019/056232 filed Mar. 13, 2019, published as WO 2019/179839 on Sep. 26, 2019, which claims the benefit of European Patent Application Number 18163427.0 filed Mar. 22, 2018. These applications are hereby incorporated by reference herein.

FIELD OF THE INVENTION

The present disclosure relates to a food processing apparatus for use with a near-infrared light source and a sensor. In particular, the present disclosure relates to a food processing apparatus for use with a near-infrared light source and a sensor such that an amount of a type of macronutrient in a food stuff in the food processing apparatus can be determined.

BACKGROUND OF THE INVENTION

WO 2018/019620 A1 discloses that a food blender has an optical analysis system comprising a sensor module having a light source and a light sensor for sensing reflected light, and a reference reflector. At least one of the sensor module and the reference reflector is mounted on a rotatable blade of the food blender at the base of the vessel of the blender. This provides a best location for optical analysis since this area is clear of foam. By using the blade as a mounting for at least part of the optical analysis system, an efficient use of space is ensured.

Many people are gradually becoming more health-conscious and recognize that a good diet is important to health and well-being. There is accordingly an increasing demand for kitchen appliances that are capable of identifying and/or measuring macronutrients in food content, for example a table top blender with the functionality of detecting an amount of each of a plurality of macronutrients of the food content inside the jar of the blender. The functionality of measuring or estimating the amounts of macronutrients in food stuff is particularly useful for users who consume liquid food for at least a part of their diets and are interested in the nutrient intake of their diets.

Near-infrared (NIR) spectroscopy is one of the known techniques for evaluation of macronutrients in food stuff. Near-infrared light is defined as the wavelength region from 730 to 2500 nm, lying between the visible light with shorter wavelengths and the infrared length with longer wavelengths. Mid-infrared radiation (2500-50000 nm) provides energy quanta causing change in the vibrational energy states of the molecules. When a food sample is irradiated, light is absorbed selectively according to the specific vibration frequencies of the molecules present and gives rise to a spectrum. Mid-infrared spectra of food ingredients may consist of sharp absorption bands, from which organic compounds may be identified.

NIR spectroscopy offers a number of important advantages in the evaluation of macronutrients in food and/or drink, in addition to its rapidity. It is a physical, non-destructive method that requires minimal or no sample preparation and with a high precision. In contrast with traditional chemical analysis, no reagents are required and no wastes are produced. Moreover, as it is a multi-analytical technique, several determinations can be made simultaneously. Hence, it is desirable to integrate the use of NIR spectroscopy in a food processing device, such as a blender, so as to provide a straightforward way for users to evaluate the macronutrients in a food stuff in the food processing device.

In order to establish a sufficiently reliable model for macronutrient evaluation in a liquid food stuff, the NIR spectroscopy system has to measure the absorption of the emitted near-infrared light by the food stuff, rather than the reflection, due to its low signal to noise ratio. In order to establish the path for the near-infrared light through the liquid, where the path length is in the order of a few centimeters, an optical component is to be used in combination with the NIR spectroscopy system.

One of the problems associated with the integration of NIR spectroscopy system and the optical component into a food processing device is the potential mechanical damage that could be caused by the moving food ingredients in the device, in particular when abrasive solid food ingredients are used. For example, the moving food ingredients during the operation of the device may damage a surface of a reflecting surface of an optical component and detrimentally affect the reflected light path of the near-infrared light. In addition to potential mechanical damage, discoloration may also occur which may result in changes of the near-infrared spectrum reflected and subsequently received at the sensor of the system. Although in some instances the extent of damage or discoloration may be compensated by performing calibration, the calibration operation required to provide this compensation would mean that additional steps have to be carried out by a user. This may cause inconvenience and also possibilities of introducing errors during the calibration process. Moreover, if the extent of damage and/or discoloration reaches beyond a certain threshold, compensation by means of calibration may not even be possible.

One of the ways to address the issue of mechanical damage and/or discoloration is to configure the NIR system such that near-infrared light enters and exits at points away from areas with a high flow of food ingredients. However, this method may result in other problems such as a low signal to noise ratio and/or low practicability.

SUMMARY OF THE INVENTION

As noted above, there are a number of disadvantages associated with the currently available techniques for providing a food processing apparatus for use with a near-infrared light source and a sensor. For example, currently known arrangements rely on placing light entry and exit points away from areas with a high flow of food ingredients. However, these arrangements may reduce the accuracy of the measurement of macronutrients in the food stuff in the food processing apparatus. It would therefore be advantageous to provide an improved apparatus for use with a near-infrared light source and a sensor so as to minimize the effect of mechanical damage and/or discoloration on the light path of the emitted and reflected near-infrared light.

To better address one or more of the concerns mentioned earlier, in a first aspect, a food processing apparatus for use with a near-infrared light source and a sensor is provided. The apparatus comprises: a food processing chamber configured to receive a food stuff, a food processing unit configured to process the food stuff in the food processing chamber, and an optical component configured to reflect emitted near-infrared light from the near-infrared light source towards the sensor, wherein the optical component is arranged at the food processing unit or a channel formed in the food processing chamber.

In some embodiments, the channel may be formed by a recess portion at a base of the food processing chamber, and the optical component may be arranged at a first side wall of the channel.

In some embodiments, the channel may be formed by a portion of an inner surface of the food processing chamber and a protruding portion at a base of the food processing chamber, and the optical component may be arranged at a first side wall of the channel.

In some embodiments, the food processing apparatus may further comprise a protective element arranged at a second side wall of the channel. In these embodiments, the second side wall may be opposite to the first side wall and the position of the protective element may correspond to the position of the optical component.

In some embodiments, the protective element and the optical component may be formed as a single integral unit.

In some embodiments, the optical component may be a first optical component, and the food processing apparatus may further comprises a second optical component. In these embodiments, the first optical component may be arranged at the first side wall of the channel and the second optical component may be arranged at the second side wall of the channel, and the first side wall of the channel may be configured such that incoming light from the near-infrared light source is reflected at the first optical component towards the second optical component, and incoming light from the second optical component may be reflected towards the sensor.

In some embodiments, the channel may be configured such that its cross-sectional area increases along its length in a direction along a flow generated by the food processing unit during operation.

In some embodiments, the food processing unit may comprise a shaft configured to be connected to a motor, and the optical component may be arranged at the shaft of the food processing unit.

In some embodiments, the food processing unit may comprise a mounting unit, and the optical component may be arranged at the mounting unit.

In some embodiments, the optical component may comprise a mirror component. Also, in some embodiments, the optical component may comprise a protective layer. In these embodiments, the protective layer may comprise hard glass.

In a second aspect, there is provided a system comprising a food processing apparatus as described above. The system may further comprise: a near-infrared light source configured to emit near-infrared light, a sensor configured to measure reflected near-infrared light spectrum, and a control unit configured to determine an amount of at least one type of macronutrient in the food stuff, based on the reflected near-infrared light spectrum.

In some embodiments, the system may further comprise a base unit onto which the food processing chamber of the apparatus is removably mounted. In these embodiments, the near-infrared light source and the sensor may be integrated at the base unit.

In some embodiments, the system may further comprise a stirring unit. In these embodiments, the near-infrared light source and the sensor may be integrated at the stirring unit, and the stirring unit may further comprise a light guiding portion configured to guide light from the near-infrared light source to the food stuff received in the food processing chamber, and to guide reflected light to the sensor.

According to the aspects and embodiments described above, the limitations of existing techniques are addressed. In particular, the above-described aspects and embodiments allows a food processing apparatus to be used with a near-infrared light source and a sensor while reducing the likelihood of detrimental impact caused by flowing food stuff (e.g. mechanical damage) to an optical component in the apparatus.

These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF EMBODIMENTS

As noted above, there is provided an improved food processing apparatus which addresses the existing problems.

Figure 1:
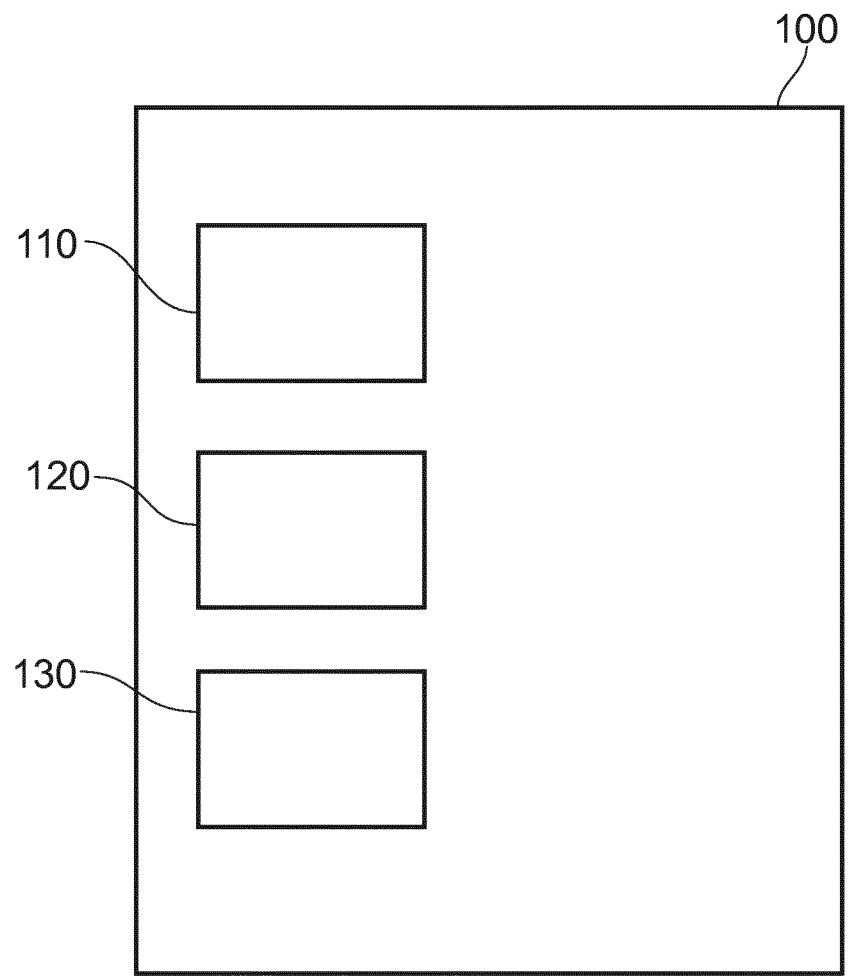
FIG. 1 is a block diagram of an apparatus for use with a near-infrared light source and a sensor according to an embodiment.

FIG. 1 shows a block diagram of an apparatus 100 for use with a near-infrared light source and a sensor according to an embodiment. In some embodiments, the apparatus 100 may be a food processing apparatus such as a blender, a masticating juicer, or a food processor, etc. It will be appreciated that the apparatus 100 may be any apparatus that comprise a food processing (e.g. cutting or stirring) function.

As illustrated in FIG. 1, the apparatus 100 comprises a food processing chamber 110, a food processing unit 120, and an optical component 130. The food processing chamber 110 is configured to receive a food stuff (e.g. a plurality of food ingredients). The food processing chamber 110 may be made of any material or combination of materials, preferably a transparent material so as to allow a user to observe the food processing operation and a status of the food stuff placed inside the food processing chamber 110 during use of the apparatus 100. Moreover, although not illustrated in FIG. 1, in some embodiments the apparatus 100 may comprise a covering element for covering the food processing chamber 110 to confine the food stuff within. The covering element may be provided in the form of a lid that is removable from the food processing chamber 110, or a hinged lid. In some embodiments, a lock mechanism may be provided so as to secure the covering element at the food processing chamber 110 during use of the apparatus 100.

The food processing unit 120 is configured to process the food stuff in the food processing chamber 110. As will be apparent from the various embodiments of the present disclosure, the food processing unit 120 is located inside the food processing chamber 110 such that food stuff placed inside the container 110 may be processed directly by the food processing unit 120. In some embodiments, the food processing unit 120 may comprise a cutting element. Also, in some embodiments, the food processing unit 120 may comprise a shaft configured to be connected to a motor, and/or a mounting unit. This will be explained in more detail with reference to FIG. 8 to FIG. 10.

The optical component 130 is configured to reflect emitted near-infrared light from the near-infrared light source towards the sensor. In some embodiments, the optical component 130 may comprise at least one of a mirror component. The mirror component may be a reflective metal component comprising a coating of a metal with a high reflectivity. For example, in some embodiments, the mirror component may comprise a coating of silver, gold, stainless steel, and/or aluminium. Additionally, in some embodiments, the optical component 130 may comprise a protective layer, for example a hard glass layer. As will be explained in more detail with reference to the embodiments described below, the optical component 130 is arranged at the food processing unit 120 or a channel formed in the food processing chamber 110. Therefore, when emitted near-infrared light from the near-infrared light source enters the food processing chamber 110, the emitted light is guided through the food stuff inside the food processing chamber 110 and reach the optical component 130 at which the light is reflected. The optical component 130 is further arranged (e.g. by way of its orientation) such that the reflected near-infrared light then exits the food processing chamber 110 to reach the sensor. As the optical component 130 is arranged either at the food processing unit 120 or a specific channel formed in the food processing chamber 110, the likelihood of mechanical damage can be reduced while ensuring that a sufficient signal to noise ratio of the light spectrum received at the sensor can be achieved.

It will be appreciated that FIG. 1 only shows the components required to illustrate an aspect of the apparatus 100, and in a practical implementation, the apparatus 100 may comprise alternative or additional components to those shown. For example, as illustrated in some of the embodiments described below, the apparatus 100 may further comprise a protective element arranged at the food processing chamber 110. Moreover, in some embodiments, the protective element may comprise hard glass material so as to confer protection to the entry point and/or exit point of the near-infrared light at the food processing chamber. This further reduces the likelihood of mechanical damage and/or discoloration of the components of the apparatus 100 which may cause undesired effects to the light path of the emitted and reflected near-infrared light.

Figure 2:
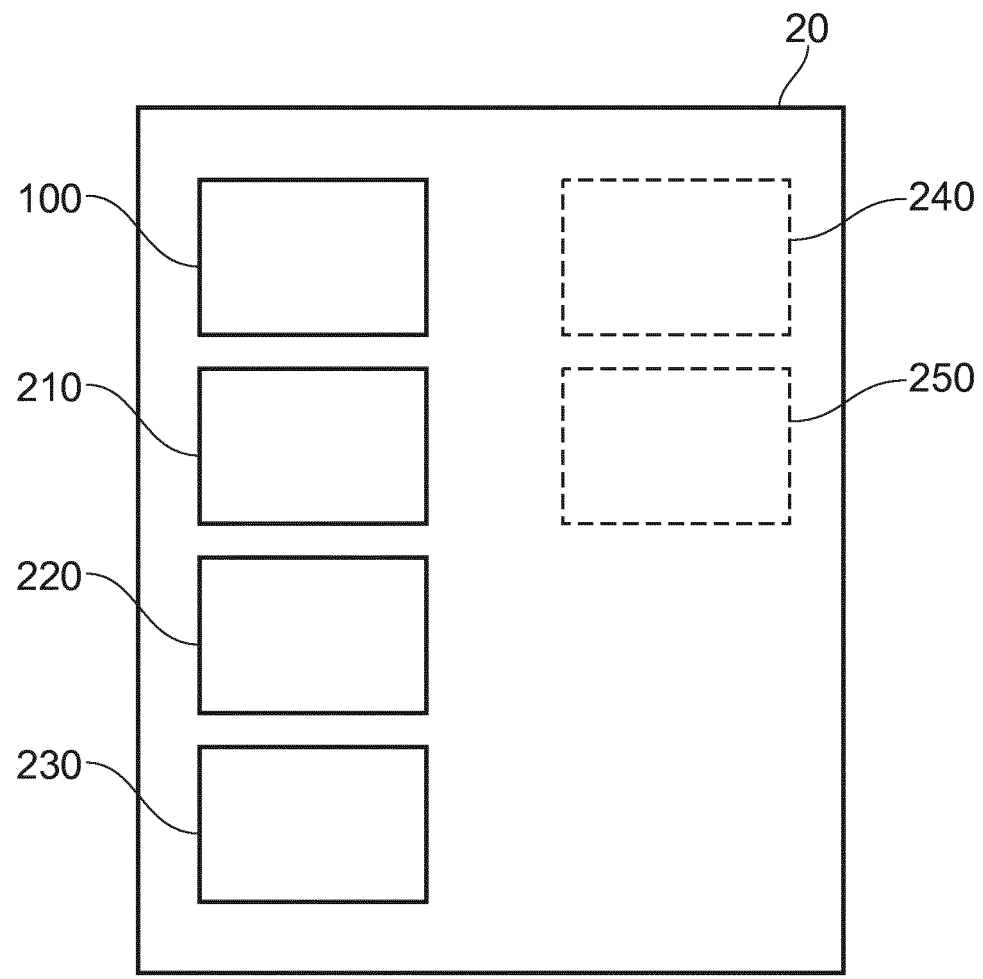
FIG. 2 is a block diagram of a system according to an embodiment.

FIG. 2 shows a block diagram of system 20 comprising an apparatus 100, such as the food processing apparatus described with reference to FIG. 1, a near-infrared light source 210, a sensor 220, a control unit 230, a stirring unit 240, and a base unit 250. As explained with reference to FIG. 1, the apparatus 100 may comprise a food processing chamber, a food processing unit, and an optical component. For the sake of brevity, explanation relating to the food processing chamber, the food processing unit, and the optical component is omitted as these components essentially function in the same way as described in relation to the apparatus 100 illustrate in FIG. 1.

In some embodiments, the system 20 may be implemented as a blender, a masticating juicer, or a food processor, etc. It will be appreciated that in these embodiments the system 20 may be implemented as any apparatus that comprise a food processing (e.g. cutting or stirring) function. Moreover, in these embodiments, the apparatus 100 of the system 20 may serve as a component of the food processing device, rather than being the food processing device itself.

The near-infrared light source 210 is configured to emit near-infrared light. In some embodiments, the near-infrared light source 210 may be configured to emit near-infrared light in the range of wavelength between 780 nm to 2500 nm, and in particular in the range of 780 nm to 1200 nm. During operation of the system 20, the emitted near-infrared light from the near-infrared light source 210 enters the food processing chamber of the apparatus 100 and through the food stuff received in the food processing chamber and is then reflected at the optical component. The sensor 220 is configured to measure reflected near-infrared light spectrum from the optical component, and the control unit 230 is configured to determine an amount of at least one type of macronutrient in the food stuff, based on the reflected near-infrared light spectrum measured by the sensor 220. In some embodiments, the sensor may be located adjacent to the food processing chamber of the apparatus 100 and connected to the control unit 230 wirelessly or via a wired connection.

In some embodiments, the near-infrared light source 210 and the sensor 220 may be integrated as a single near-infrared light emitting and sensing module (herein referred to as "near-infrared light module"). The near-infrared light module may be provided as a separate component which can be removably coupled to the food processing chamber of the apparatus 100, or as a component which is integrated at the food processing chamber of the apparatus 100 or the base unit 250 of the system 20. Moreover, in some embodiments, the near-infrared light source 210, the sensor 220, and the control unit 230 may be integrated as a single near-infrared light module.

Also, in some embodiments, the near-infrared light source 210 and the sensor 220 may be integrated at the stirring unit 240. In these embodiments, the stirring unit 240 may be a spoon or a spatula. In addition, in these embodiments, the stirring unit 240 may further comprise a light guiding portion configured to guide light from the near-infrared light source 210 to the food stuff received in the food processing chamber of the apparatus 100, and to guide reflected light form the optical component of the apparatus 100 to the sensor 220. This will be explained in more detail with reference to FIG. 11.

As mentioned above, the control unit 230 is configured to determine an amount of at least one type of macronutrient in the food stuff based on the reflected near-infrared light spectrum measured by the sensor 220. The determination of an amount of at least one type of macronutrient at the control unit 230 may be based on a model that is generated based on known near-infrared spectra of a plurality of food ingredients and their respective known macronutrients. The model may be a chemometric model and the model may be generated and/or trained further based on a comparison between the measured near-infrared light spectrum by the sensor 230 against the spectra of a plurality of macronutrients (i.e. carbohydrates, proteins, fats, dietary fiber, and water). The determination of an amount of at least one type of macronutrient may comprise a sub-class of a type of macronutrient, such as glucose. Moreover, the determination of an amount of at least one type of macronutrient may comprise determining a relative amount of each of a plurality of macronutrients in the food stuff.

By using a chemometric model, a reliable prediction of an amount of at least one type of macronutrient may be determined based on its near-infrared spectrum. It will be appreciated that the reliability of determining an amount of at least one type of macronutrient based on a chemometric model may depend on the variation and/or the size of the food ingredients the chemometric model is trained upon, the accuracy by which the amount of macronutrients of these ingredients for training is known, as well as the accuracy parameters of the device(s) and/or technique(s) (e.g. chemical determination) used for obtaining the training data (such as data related to at least one comparison between the measured near-infrared light spectrum against the spectra of a plurality of macronutrients). The approach of using a chemometric model is typically more suitable in cases where the food stuff comprises a complex mixture of different types of macronutrients.

In alternative embodiments, the determination of an amount of at least one type of macronutrient may be directly based on a comparison between the measured near-infrared light spectrum by the sensor and the spectra of a plurality of macronutrients. For example, the measured near-infrared light spectrum may be compared against a plurality of spectra, each associated with a type of pure substance (e.g. protein powder dissolved in water, fiber dissolved in water, animal or vegetable oil, sugar solutions). This approach is typically more suitable in cases where the food stuff comprises a small number of different types of macronutrients.

The control unit 230 may be implemented in numerous ways, with software and/or hardware, to perform the various functions described herein. For example, the control unit 230 may be implemented as a component of an external device, e.g. a smart phone or a smart device, or as program code or software in a digital cloud that is connected to the sensor 220. The control unit 230 may comprise one or more microprocessors or digital signal processor (DSPs) that may be programmed using software or computer program code to perform the required functions and/or to control components of the control unit 230 to effect the required functions. The control unit 230 may be implemented as a combination of dedicated hardware to perform some functions (e.g. amplifiers, pre-amplifiers, analog-to-digital converters (ADCs) and/or digital-to-analog converters (DACs)) and a processor (e.g. one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

In various implementations, the control unit 230 may be associated with or comprise one or more memory units that comprise any type of memory, such as cache or system memory including volatile and non-volatile computer memory such as random access memory (RAM), static RAM (SRAM), dynamic RAM (DRAM), read-only memory (ROM), programmable ROM (PROM), erasable PROM (EPROM), and electrical erasable PROM (EEPROM). The control unit 230 or associated memory unit can also be used for storing program code that can be executed by a processor in the control unit 230 to perform the functions described herein. In some embodiments, the memory unit can store spectra of a plurality of macronutrients for comparison with a measured near-infrared light spectrum at the control unit 230.

In some embodiments, the system 20 may further comprise a user interface (not shown in the drawing). The user interface of the apparatus 20 may be for use in providing a user of the food processing apparatus 100 and/or the system 20 with information resulting from the determination of an amount of at least one type of macronutrient in the food stuff at the control unit 230. The control unit 230 of the system 20 may be configured to control the user interface to provide the information relating to the determined amount of the at least one type of macronutrient in the food stuff in the food processing chamber. The user interface as referred to herein may be any user interface that enables the rendering (or output or display) of data (or information) to a user of the apparatus 100 and/or the system 20. The user interface may comprise display unit in some embodiments.

Alternatively or in addition, a user interface as referred to herein may be any user interface that enables a user of the apparatus 100 and/or the system 20 to provide additional user input, interact with and/or control the apparatus 100 and/or the system 20. For example, a user interface as referred to herein can comprise one or more switches, one or more buttons, a keypad, a keyboard, a gesture recognition sensor, a touch screen or an application (for example, one a tablet or smartphone), one or more microphones or any other audio component, or any other user interface component, or combination of user interface components.

The base unit 250 is configured to support the food processing chamber of the apparatus 100. In some embodiments, the food processing chamber of the apparatus 100 may be configured to be removably mounted onto the base unit 250 such that it is secured to the base unit 250 during use of the apparatus 100. The food processing chamber of the apparatus 100 may be detached from the base unit 250 for example for purposes of cleaning the food processing chamber and/or the base unit 250. As mentioned above, in some embodiments at least one of the near-infrared light source 210 and the sensor 220 may be integrated at the base unit 250.

It will be appreciated that FIG. 2 only shows the components required to illustrate this aspect of the system and, in a practical implementation, the system 20 and the food processing apparatus 100 may comprise additional components to those shown. For example, the system 20 may comprise a battery or other power supply for powering the system (e.g. the control unit 230) or means for connecting the system 20 to a mains power supply. It will also be appreciated that in some embodiments, the system 20 may not comprise a stirring unit 240 or a base unit 250.

Figure 3A:
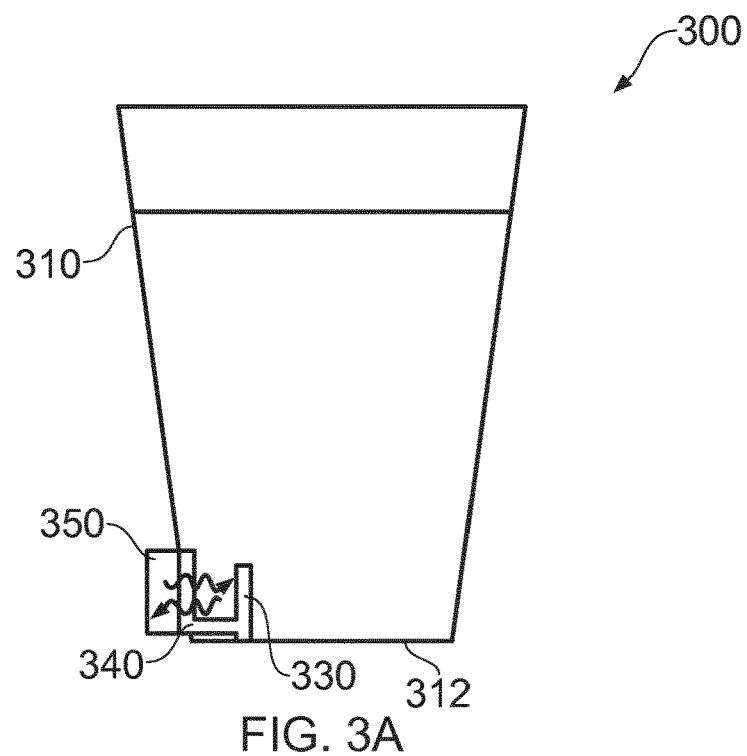
FIG. 3A is a perspective view schematic diagram of a food processing apparatus according to an embodiment.
Figure 3B:
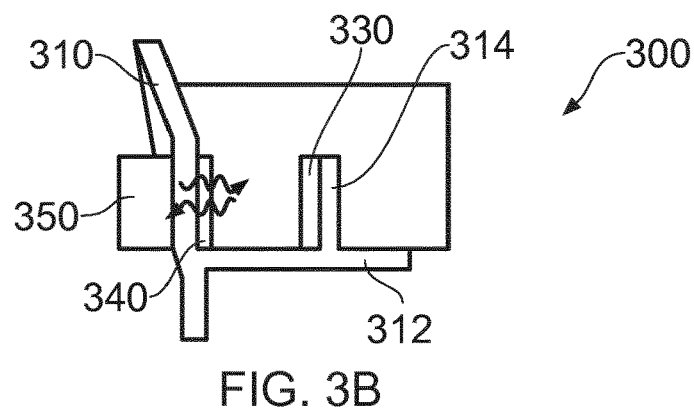
FIG. 3B is a partial cross-sectional view schematic diagram of the food processing apparatus of FIG. 3A.
Figure 3C:
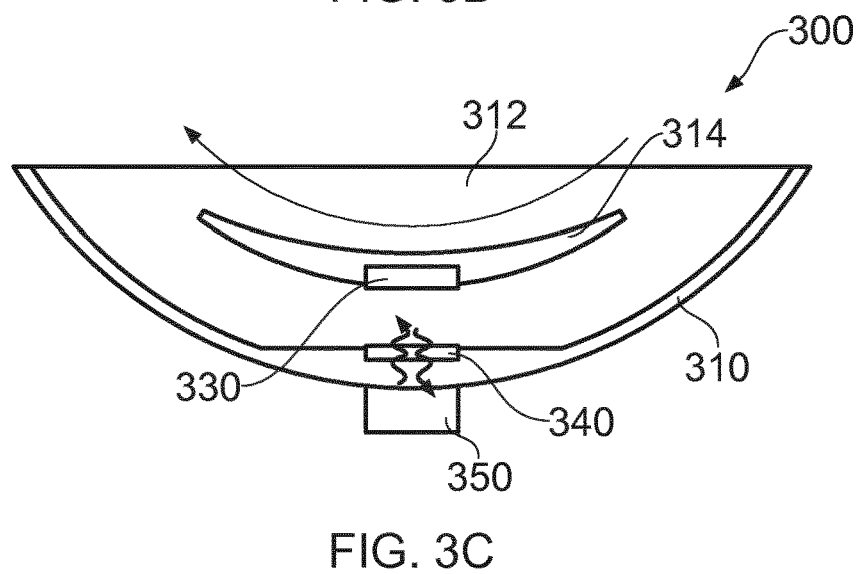
FIG. 3C is a partial top view schematic diagram of the food processing apparatus of FIG. 3A.

FIG. 3A, FIG. 3B, and FIG. 3C are respectively a perspective view schematic diagram, a partial cross-sectional view schematic diagram, and a partial top view schematic diagram of a food processing apparatus 300 according to an embodiment.

With reference to FIG. 3A and FIG. 3B, the food processing apparatus 300 comprises a food processing chamber 310 to which a near-infrared light module 350 can be attached as shown in the drawings. In this embodiment, the near-infrared light module 350 comprises an integrated near-infrared light source configured to emit near-infrared light and an integrated sensor configured to measure reflected near-infrared light spectrum. The food processing apparatus 300 further comprises a food processing unit (not shown in the drawing), an optical component 330, and a protective element 340.

In this present embodiment, the food processing chamber 310 further comprises a base 312 at which a channel is formed. In more detail, the food processing chamber 310 comprises a protruding portion 314 at the base 312, which forms a channel with an inner surface of the food processing chamber 310. The protruding portion 314 may adopt a curved shape so as to correspond to a portion of the curved surface of the food processing chamber 310 in this embodiment, as well as to correspond with a flow generated by the food processing unit of the apparatus 300 (in a direction as indicated by the arrow shown in FIG. 3C).

As shown in FIG. 3B, the optical component 330 is arranged at a first side wall of the channel while the protective element 340 is arranged at a second side wall of the channel, the second side wall being opposite to the first side wall. Furthermore, the position of the protective element 340 corresponds to the position of the optical component 330, as illustrated in FIG. 3B and FIG. 3C. The optical component 330 may further comprise a protective layer, for example a hard glass layer. In this embodiment, the optical component 330 and the protective element 340 is formed as a single integral unit. Therefore, the single integral unit comprising the optical component 330 and the protective element 340 may be manufactured and subsequently assembled in the food processing apparatus 300 easily.

Moreover, as illustrated in FIGS. 3A to 3C, the near-infrared light module 350 in the present embodiment is coupled to the food processing chamber 310 such that emitted near-infrared light from the near-infrared light module 350 enters the food processing chamber 310 at a point corresponding to the position of the optical component 330 and the protective element 340, and such that reflected near-infrared light from the optical component 330 is guided through the protective element 340 towards the near-infrared light module 350.

When the food processing apparatus 300 is in operation, the food processing unit generates a flow of food stuff such that at least a portion of the food stuff flows through the channel formed by the protruding portion 314 and the inner surface of the food processing chamber 310. Near-infrared light emitted from the near-infrared light module 350 enters the food processing chamber 310, passes through the protective element 340 and a portion of the food stuff in the channel, before being reflected at the optical component 330 and again through the portion of the food stuff, reaching the near-infrared light module 350 to be measured by the sensor in the near-infrared light module 350. Since the optical component 330 is arranged on a side wall of the channel formed in the food processing chamber 310, the optical component 330 can be shielded from the direct impact of the flow of food stuff generated by the food processing unit. Hence, there is a reduced likelihood of mechanical damage of the optical component 330 in this embodiment.

Figure 4A:
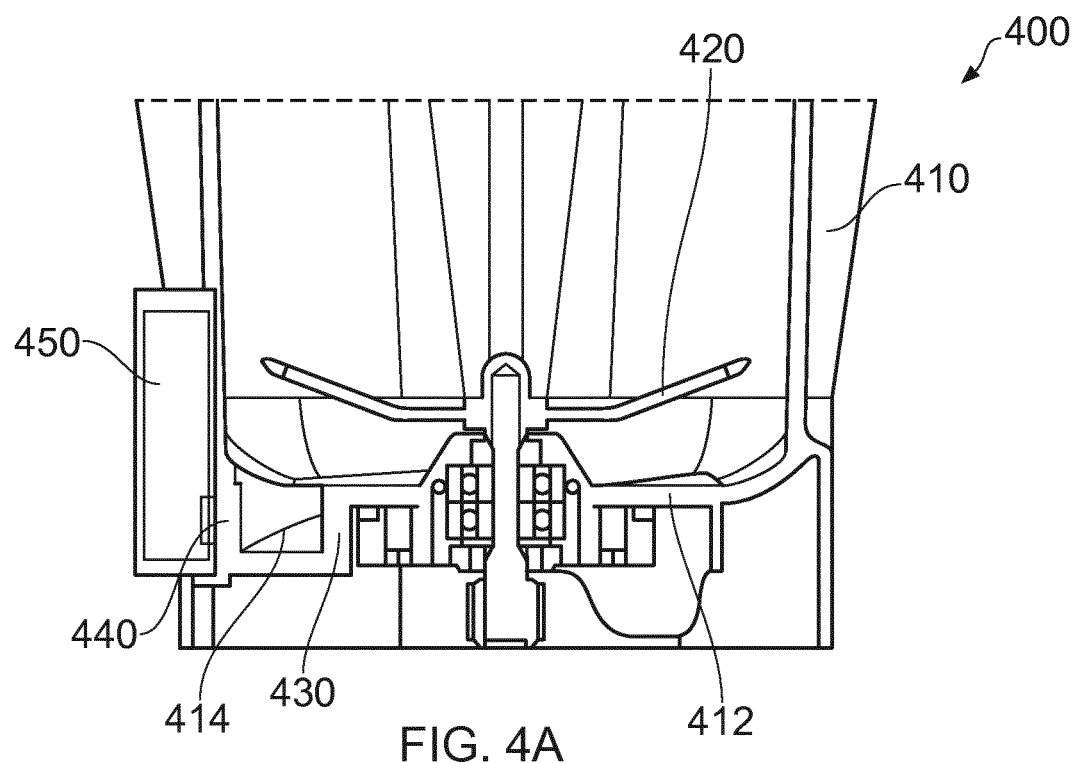
FIG. 4A is a partial cross-sectional view of an implementation of a food processing apparatus according to an embodiment.
Figure 4B:
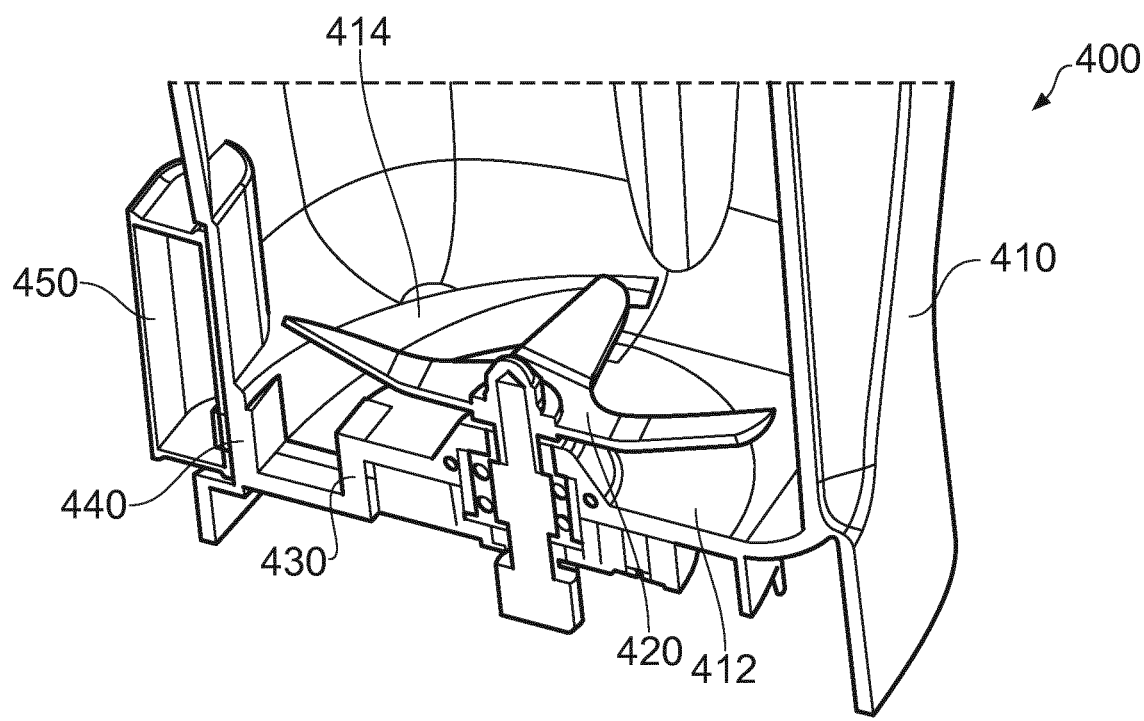
FIG. 4B is a partial perspective view of the food processing apparatus of FIG. 4A.

FIG. 4A and FIG. 4B are respectively a partial cross-sectional view and a partial cross-sectional view of an implementation of a food processing apparatus 400 according to an embodiment.

With reference to FIG. 4A and FIG. 4B, the food processing apparatus 400 comprises a food processing chamber 410 to which a near-infrared light module 450 can be attached as shown in the drawings. In this embodiment, the near-infrared light module 450 comprises an integrated near-infrared light source configured to emit near-infrared light and an integrated sensor configured to measure reflected near-infrared light spectrum. In addition, as shown in FIG. 4A and FIG. 4B, the near-infrared light module 450 is configured such that it can be removably coupled to the food processing chamber 410. The food processing apparatus 400 further comprises a food processing unit 420, an optical component 430, and a protective element 440.

In this present embodiment, the food processing chamber 410 comprises a base 412 at which a channel is formed. In more detail, the food processing chamber 410 comprises a recess portion 414 at the base 412. The recess portion 414 forms a channel at which the optical component 430 is arranged, and it may adopt a curved shape so as to correspond to a flow generated by the food processing unit 420. In addition, the channel in this embodiment is configured such that its cross-sectional area increases along its length in a direction along a flow generated by the food processing unit 420. FIG. 4B shows this increase in cross-sectional area of the channel in an anti-clockwise direction (viewing from the top of the food processing apparatus 400). The increase in cross-sectional area of the channel helps prevent food ingredients or food stuff from becoming trapped or stuck in the channel.

As shown in FIG. 4A and FIG. 4B, the optical component 430 is arranged at a first side wall of the channel while the protective element 440 is arranged at a second side wall of the channel, the second side wall being opposite to the first side wall. Furthermore, the position of the protective element 440 corresponds to the position of the optical component 430, as illustrated in FIG. 4A. The protective element 440 is configured to protect a part of the food processing chamber 410 between the protective element 440 and the near-light module 450 against discoloration. The optical component 430 may further comprise a protective layer, for example a hard glass layer. In this embodiment, the optical component 430 and the protective element 440 is formed as a single integral unit. Therefore, the single integral unit comprising the optical component 430 and the protective element 440 may be manufactured and subsequently assembled in the food processing apparatus 400 easily.

Moreover, in the present embodiment, the near-infrared light module 450 is coupled to the food processing chamber 410 such that emitted near-infrared light from the near-infrared light module 450 enters the food processing chamber 410 at a point corresponding to the position of the optical component 430 and the protective element 440, and such that reflected near-infrared light from the optical component 430 is guided through the protective element 340 towards the near-infrared light module 450.

When the food processing apparatus 400 is in operation, the food processing unit 420 generates a flow of food stuff such that at least a portion of the food stuff flows through the channel formed by the recess portion 414. Near-infrared light emitted from the near-infrared light module 450 enters the food processing chamber 410, passes through the protective element 440 and a portion of the food stuff in the channel, before being reflected at the optical component 430 and again through the portion of the food stuff, reaching the near-infrared light module 450 to be measured by the sensor in the near-infrared light module 450. Again, since the optical component 430 is arranged on a side wall of the channel formed in the food processing chamber 410, the optical component 430 can be shielded from the direct impact of the flow of food stuff generated by the food processing unit. Hence, there is a reduced likelihood of mechanical damage of the optical component 430.

Figure 5A:
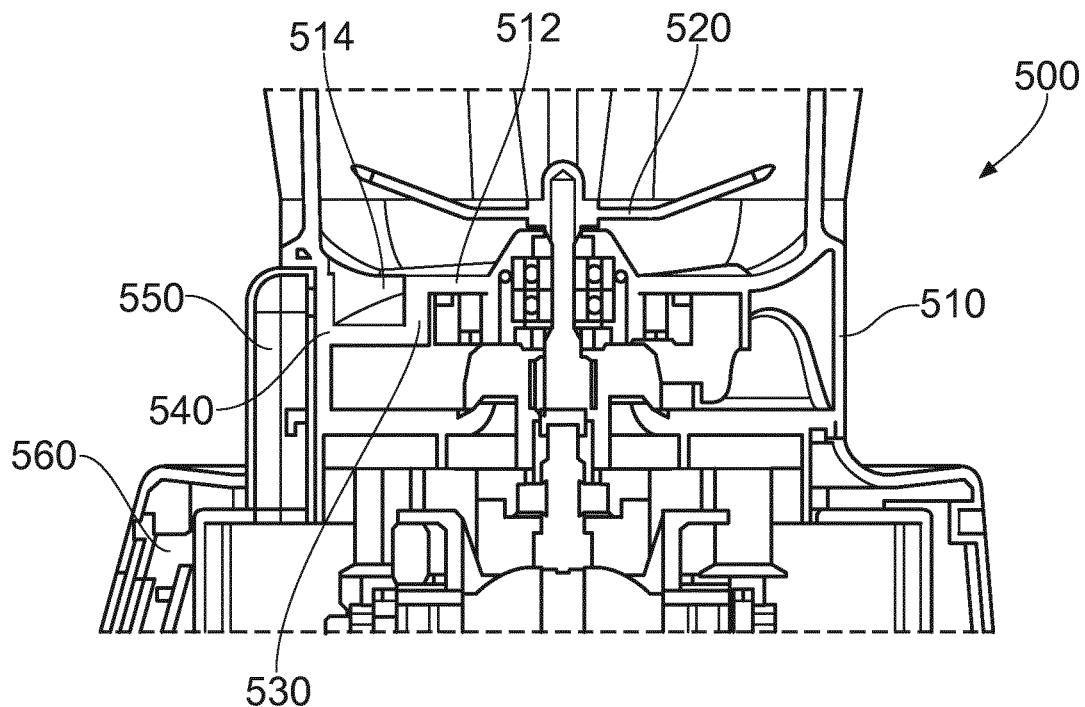
FIG. 5A is a partial cross-sectional view of an implementation of a system according to an embodiment.
Figure 5B:
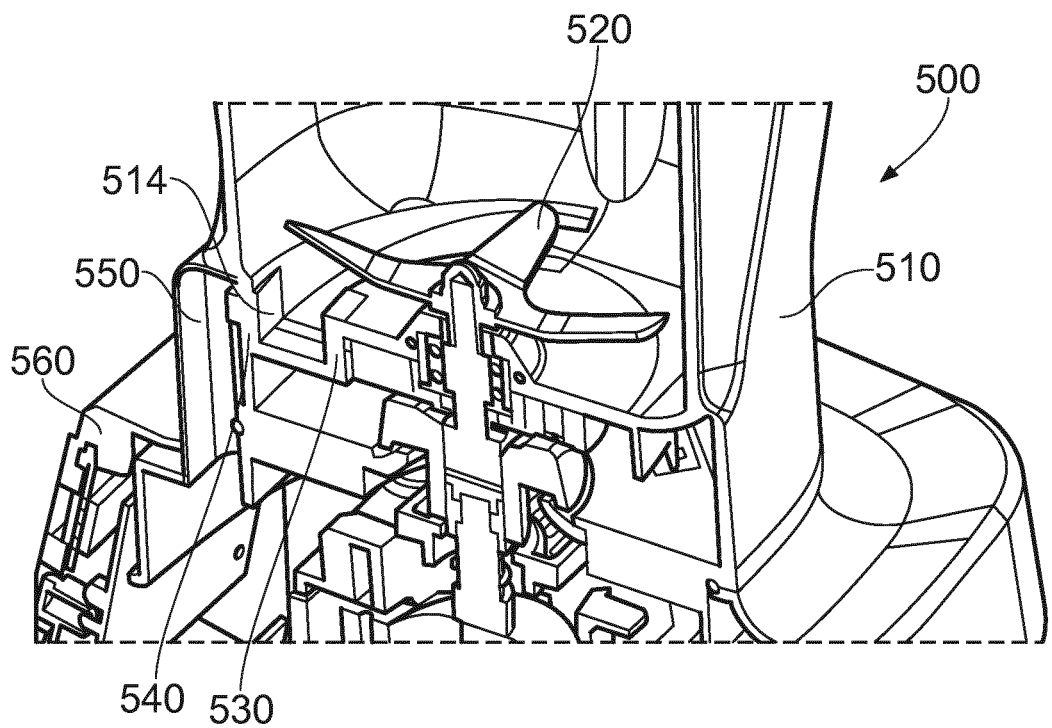
FIG. 5B is a partial perspective view of the system of FIG. 5A.

FIG. 5A and FIG. 5B are respectively a partial cross-sectional view and a partial perspective view of an implementation of a system 500 according an embodiment.

With reference to FIG. 5A and FIG. 5B, the system 500 comprises an apparatus including: a food processing chamber 510, a food processing unit 520, an optical component 530, and a protective element 540. The system 500 further comprises a base unit 560 and a near-infrared light module 550. The near-infrared light module 550 comprises an integrated near-infrared light source configured to emit near-infrared light and an integrated sensor configured to measure reflected near-infrared light spectrum. Furthermore, the near-infrared light module 550 in this embodiment is integrated at the base unit 560 such that a part of the near-infrared light module 550 is coupled to the food processing chamber 510.

In this present embodiment, the food processing chamber 510 comprises a base 512 at which a channel is formed. In more detail, the food processing chamber 510 comprises a recess portion 514 at the base 512. The recess portion 514 forms a channel at which the optical component 530 is arranged, and it may adopt a curved shape so as to correspond to a flow generated by the food processing unit 520. In addition, the channel in his embodiment is configured such that its cross-sectional area increases along its length in a direction along a flow generated by the food processing unit 520. FIG. 5B shows this increase in cross-sectional area of the channel in an anti-clockwise direction (viewing from the top of the system 500). The increase in cross-sectional area of the channel helps prevent food ingredients or food stuff from becoming trapped or stuck in the channel.

As shown in FIG. 5A and FIG. 5B, the optical component 530 is arranged at a first side wall of the channel while the protective element 540 is arranged at a second side wall of the channel, the second side wall being opposite to the first side wall. Furthermore, the position of the protective element 540 corresponds to the position of the optical component 530, as illustrated in FIG. 5A. The optical component 530 may further comprise a protective layer, for example a hard glass layer. In this embodiment, the optical component 530 and the protective element 540 is formed as a single integral unit. Therefore, the single integral unit comprising the optical component 530 and the protective element 540 may be manufactured and subsequently assembled in the food processing apparatus easily.

Moreover, in the present embodiment, the near-infrared light module 550 is coupled to the food processing chamber 510 such that emitted near-infrared light from the near-infrared light module 550 enters the food processing chamber 510 at a point corresponding to the position of the optical component 530 and the protective element 540, and such that reflected near-infrared light from the optical component 530 is guided through the protective element 540 towards the near-infrared light module 550.

When the system 500 is in operation, the food processing unit 520 generates a flow of food stuff such that at least a portion of the food stuff flows through the channel formed by the recess portion 514. Near-infrared light emitted from the near-infrared light module 550 enters the food processing chamber 510, passes through the protective element 540 and a portion of the food stuff in the channel, before being reflected at the optical component 530 and again through the portion of the food stuff, reaching the near-infrared light module 550 to be measured by the sensor in the near-infrared light module 550. Again, since the optical component 530 is arranged on a side wall of the channel formed in the food processing chamber 510, the optical component 530 can be shielded from the direct impact of the flow of food stuff generated by the food processing unit. Hence, there is a reduced likelihood of mechanical damage of the optical component 530.

Figure 6:
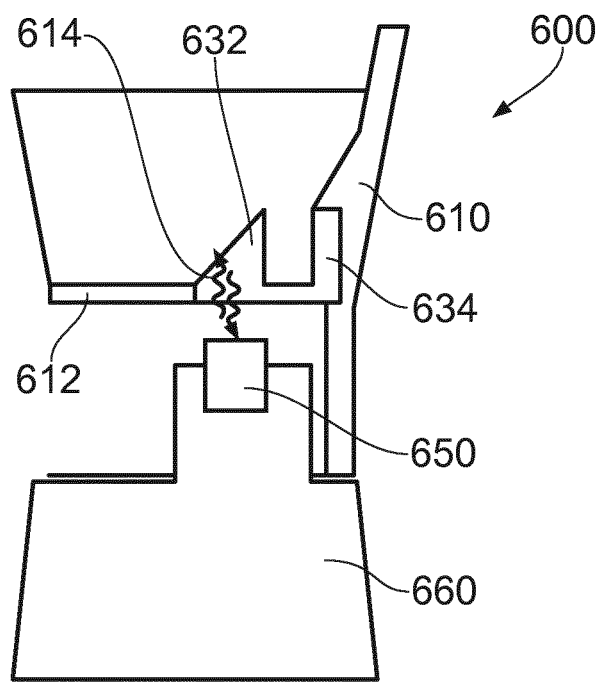
FIG. 6 is a partial cross-sectional view schematic diagram of a system according to an embodiment.
Figure 7:
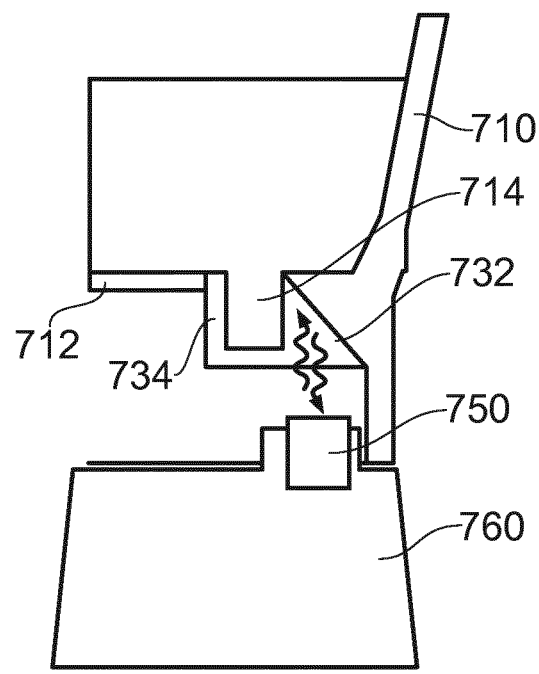
FIG. 7 is a partial cross-sectional view schematic diagram of a system according to an embodiment.

FIG. 6 is a partial cross-sectional view schematic diagram of a system 600 according to an embodiment, and FIG. 7 is a partial cross-sectional view schematic diagram of a system 700 according to another embodiment.

The system 600 as shown in FIG. 6 comprises a food processing apparatus including: a food processing chamber 610, a food processing unit (not shown in the drawing), a first optical component 632, and a second optical component 634. The system 600 further comprises a near-infrared light module 650 and a base unit 660. The near-infrared light module 650 comprises an integrated near-infrared light source configured to emit near-infrared light and an integrated sensor configured to measure reflected near-infrared light spectrum, and the near-infrared light module 650 is integrated at the base unit 660 in a manner such that emitted light is directed towards a base 612 of the food processing chamber 610 and the sensor is positioned to receive light at the base 612 of the food processing chamber 610. As shown in FIG. 6, the food processing chamber 610 is removably mounted onto the base unit 660.

Furthermore, as shown in FIG. 6, a channel is formed at the base 612 of the food processing chamber 610. In more detail, the food processing chamber 610 comprises a protruding portion 614 at the base 612, which forms a channel with a portion of the inner surface of the food processing chamber 610. In this embodiment, the protruding portion 614 forms a first side wall of the channel while a portion of the inner surface of the food processing chamber 610 forms a second side wall of the channel, the second side wall being opposite to the first side wall. The first optical component 632 is arranged at the first side wall of the channel, i.e. the protruding portion 614 in this embodiment, and the second optical component 634 is positioned at the second side wall of the channel so as to correspond to the position of the first optical component 632. Moreover, the first side wall of the channel, i.e. the protruding portion 614, is configured such that incoming light from the near-infrared light source (i.e. the near-infrared light module 650 in this embodiment) is reflected at the first optical component 632 towards the second optical component 634, and such that incoming light from the second optical component 634 is reflected towards the sensor (i.e. the near-infrared light module 650 in this embodiment).

In more detail, the first side wall of the channel in this embodiment comprise a slanted surface as illustrated in FIG. 6. Since in this embodiment the near-infrared light module 650 is arranged at the base unit 660 substantially underneath the first side wall of the channel, incoming light from the near-infrared light module 650 is reflected in a substantially right angle at the first optical component 632 and towards the second optical component 634 which is arranged at the second side wall of the channel, and incoming reflected light from the second optical component 634 is subsequently reflected in a substantially right angle at the first optical component 632 towards the near-infrared light module 650. It will be appreciated that since the positions and/or orientations of the first optical component 632 and the second optical component 634 are dependent on a position and/or orientation of the near-infrared light module 650, in some alternative embodiments the first optical component 632 and the second optical component 634 may not adopt the exact positions and/or orientations as illustrated in FIG. 6.

When the system 600 is in operation, the food processing unit generates a flow of food stuff such that at least a portion of the food stuff flows through the channel formed by the protruding portion 614 and the inner surface of the food processing chamber 610. Near-infrared light emitted from the near-infrared light module 650 enters the food processing chamber 610 before being reflected at the first optical component 632 towards the channel and through a portion of the food stuff in the channel. Subsequently, the reflected near-infrared light is reflected again at the first optical component 632 towards the near-infrared light module 650 to be measured by the sensor in the near-infrared light module 650. Since the first optical component 632 and the second optical component 634 are arranged at the side walls of the channel formed in the food processing chamber 610, the optical components can be shielded from the direct impact of the flow of food stuff generated by the food processing unit. Hence, there is a reduced likelihood of mechanical damage of the optical components 632, 634.

Similarly, the system 700 as shown in FIG. 7 comprises a food processing apparatus including: a food processing chamber 710, a food processing unit (not shown in the drawing), a first optical component 732, and a second optical component 734. The system 700 further comprises a near-infrared light module 750 and a base unit 760. The near-infrared light module 750 comprises an integrated near-infrared light source configured to emit near-infrared light and an integrated sensor configured to measure reflected near-infrared light spectrum, and the near-infrared light module 750 is integrated at the base unit 760 in a manner such that emitted light is directed towards a base 712 of the food processing chamber 712 and the sensor is positioned to receive light at the base 712 of the food processing chamber 710. As shown in FIG. 7, the food processing chamber 710 is removably mounted onto the base unit 760.

Furthermore, as shown in FIG. 7, a channel is formed is formed at the base 712 of the food processing chamber 710. In more detail, the food processing chamber 710 comprises a recess portion 714 at the base 712. The recess portion 714 forms a channel with a first side wall and a second side wall, the second side wall being opposite to the first side wall. The first optical component 732 is arranged at the first side wall of the channel, and the second optical component 734 is positioned at the second side wall of the channel so as to correspond to the position of the first optical component 732. Moreover, the first side wall of the channel, is configured such that incoming light from the near-infrared light source (i.e. the near-infrared light module 750 in this embodiment) is reflected at the first optical component 732 towards the second optical component 734, and such that incoming light from the second optical component 734 is reflected towards the sensor (i.e. the near-infrared light module 750 in this embodiment).

In more detail, the first side wall of the channel in this embodiment comprise a slanted surface as illustrated in FIG. 7. Since in this embodiment the near-infrared light module 750 is arranged at the base unit 760 substantially underneath the first side wall of the channel, incoming light from the near-infrared light module 750 is reflected in a substantially right angle at the first optical component 732 and towards the second optical component 734 which is arranged the second side wall of the channel formed in the base 712 of the food processing chamber 710, and incoming reflected light from the second optical component 734 is subsequently reflected in a substantially right angle at the first optical component 732 towards the near-infrared light module 750. It will be appreciated that since the positions and/or orientations of the first optical component 732 and the second optical component 734 are dependent on a position and/or orientation of the near-infrared light module 750, in some alternative embodiments the first optical component 732 and the second optical component 734 may not adopt the exact positions and/or orientations as illustrated in FIG. 7.

When the system 700 is in operation, the food processing unit generates a flow of food stuff such that at least a portion of the food stuff flows through the channel formed by the recess portion 714. Near-infrared light emitted from the near-infrared light module 750 enters the food processing chamber 710 before being reflected at the first optical component 732 towards the channel and through a portion of the food stuff in the channel. Subsequently, the reflected near-infrared light is reflected again at the first optical component 732 towards the near-infrared light module 750 to be measured by the sensor in the near-infrared light module 750. Since the first optical component 732 and the second optical component 734 are arranged at the side walls of the channel formed in the food processing chamber 710, the optical components can be shielded from the direct impact of the flow of food stuff generated by the food processing unit. Hence, there is a reduced likelihood of mechanical damage of the optical components 732, 734.

Although not shown in the drawings, in some embodiments, the first and second optical components of the systems as illustrated in FIG. 6 and FIG. 7 may each comprise a protective layer. In addition, in some embodiments, at least one protective element may be provided at the food processing chamber in the food processing apparatus of the system for protecting part(s) of the food processing chamber or other components of the system from discoloration.

Figure 8:
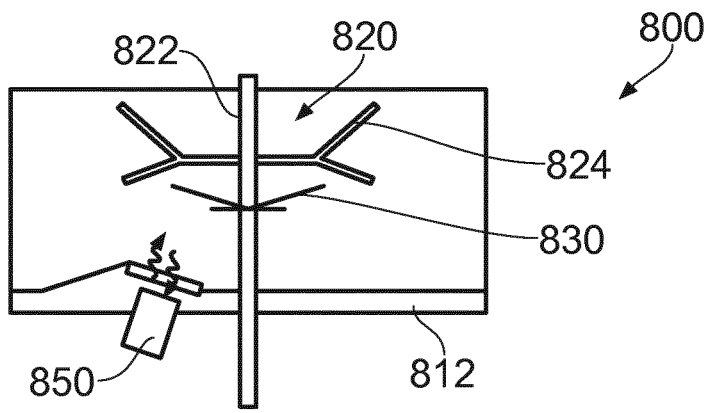
FIG. 8 is a partial cross-sectional view schematic diagram of a food processing apparatus according to an embodiment.
Figure 9:
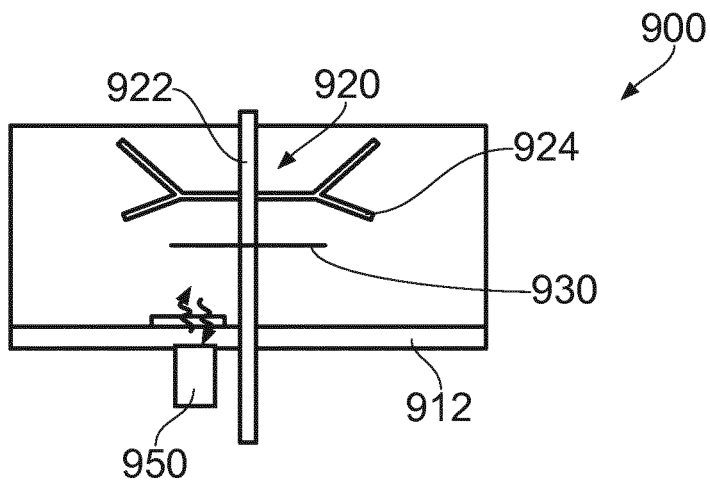
FIG. 9 is a partial cross-sectional view schematic diagram of a food processing apparatus according to an embodiment.
Figure 10:
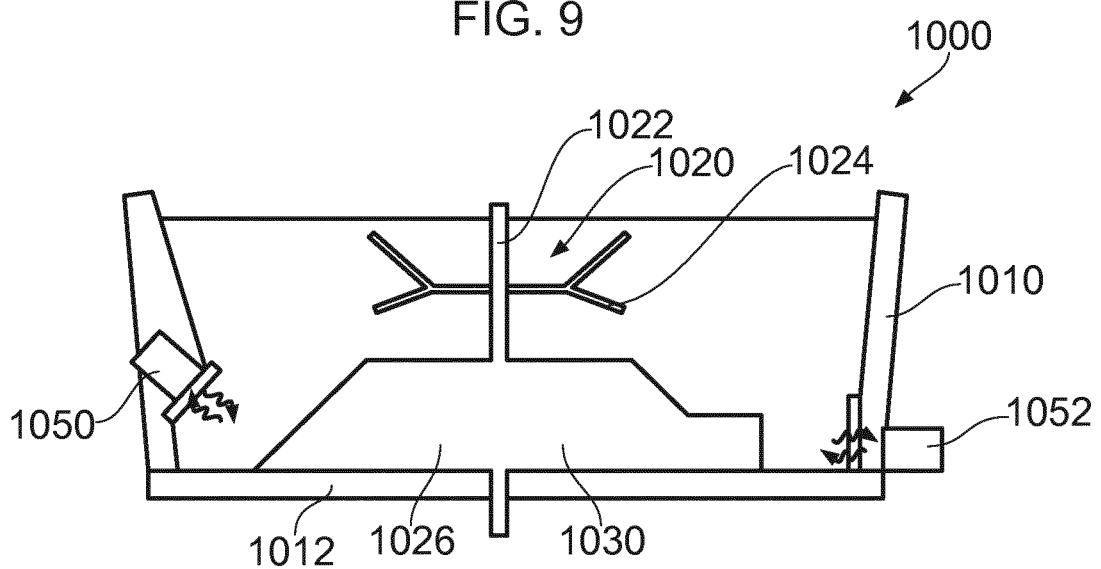
FIG. 10 is a partial cross-sectional view schematic diagram of a food processing apparatus according to an embodiment.

FIG. 8 is a partial cross-sectional view schematic diagram of a food processing apparatus 800 according to an embodiment, FIG. 9 is a partial cross-sectional view schematic diagram of a food processing apparatus 900 according to another embodiment, and FIG. 10 is a partial cross-sectional view schematic diagram of a food processing apparatus 1000 according to yet another embodiment.

The food processing apparatus 800 as shown in FIG. 8 comprises a food processing chamber having a base 812 to which a near-infrared light module 850 can be attached, a food processing unit 820, and an optical component 830. In this embodiment, the near-infrared light module 850 comprises an integrated near-infrared light source configured to emit near-infrared light and an integrated sensor configured to measure reflected near-infrared light spectrum. Moreover, in this embodiment, the food processing unit 820 comprises a shaft 822 which is configured to be connected to a motor, and a cutting element 824. The optical component 830 is arranged at the shaft 822 such that near-infrared light emitted from the near-infrared light module 850 is reflected by the optical component 830 when it reaches the optical component 830, and such that the reflected light returns to the sensor of the near-infrared light module 850 to be measured.

Similar to the food processing apparatus 800 as described with reference to FIG. 8, the food processing apparatus 900 as shown in FIG. 9 also comprises a food processing chamber having a base 912 to which a near-infrared light module 950 can be attached, a food processing unit 920, and an optical component 930. Also, similar to the near-infrared light module 850 as described with reference to FIG. 8, the near-infrared light module 950 of the present embodiment also comprises an integrated near-infrared light source configured to emit near-infrared light and an integrated sensor configured to measure reflected near-infrared light spectrum. The food processing unit 920 also comprises a shaft 922 which is configured to be connected to a motor, and a cutting element 924. The optical component 930 is arranged at the shaft 922 such that near-infrared light emitted from the near-infrared light module 950 is reflected by the optical component 930 when it reaches the optical component 930, and such that the reflected light returns to the sensor of the near-infrared module 950 to be measured.

The difference between the food processing apparatus 800 of FIG. 8 and the food processing apparatus 900 of FIG. 9 is that the optical component 830 of FIG. 8 comprises a plurality of portions, each being angled with respect to the base 812 of the food processing chamber, while the optical component 930 of FIG. 9 comprises a surface parallel to the base 912 of the food processing chamber. Accordingly, the near-infrared light modules 850, 950 of each of these embodiments is oriented so as to correspond to the orientation of the optical component, in order to allow emitted near-infrared light to be reflected back to the near-infrared light module 850, 950. Although FIG. 8 and FIG. 9 show the optical components of these embodiments being in different configurations and orientations, both of these optical components are positioned under the cutting element 824, 924 of the food processing unit 820, 920. Hence, the optical components 830, 930 of both of these embodiments are placed such that they are less likely to be subjected to the direct impact of the flow of food stuff generated by the food processing unit 820, 920, and especially by the cutting element 824, 924. There is a reduced likelihood of mechanical damage of the optical component 830, 930 as a result.

The food processing apparatus 1000 as shown in FIG. 10 is similar to the embodiments described with reference to FIG. 8 and FIG. 9. The apparatus 1000 comprises a food processing chamber 1010 to which a first near-infrared light module 1050 and a second near-infrared light module 1052 can be attached, a food processing unit 1020, and an optical component 1030. The first and second near-infrared light modules 1050, 1052 each comprises a near-infrared light source configured to emit near-infrared light and the sensor configured to measure reflected near-infrared light spectrum. In this embodiment, one of the first and second near-infrared light modules 1050, 1052 may serve as a back-up near-infrared light module, in the event the other near-infrared light module becomes faulty.

In some embodiments, the near-infrared light source of the first and second near-infrared light modules 1050, 1052 may be of different wavelength ranges. Therefore, in these embodiments, an accuracy of the determination of an amount of at least a type of macronutrient may be increased compared to apparatuses/systems comprising only one near-infrared light source.

The food processing unit 1020 further comprises a mounting unit 1026 arranged at a base 1012 of the food processing chamber 1010, a shaft 1022 which is configured to be connected to a motor, and a cutting element 1024. As shown in FIG. 10, the shaft 1022 is rotatably mounted onto the mounting unit 1026. The optical component 1030 is arranged at the mounting unit 1026 such that near-infrared light emitted from at least one of the first near-infrared light module 1050 and the second near-infrared light module 1052 is reflected by the optical component 1030 when it reaches the optical component 1030, and such that the reflected light returns to the sensor of at least one of the first near-infrared light module 1050 and the second near-infrared light module 1052 to be measured.

Since the optical component 1030 in the present embodiment is arranged at the mounting unit 1026 of the food processing unit 1020, it is less likely to be subjected to the direct impact of the flow of food stuff generated by the cutting element 1024 of the food processing unit 1020. There is a reduced likelihood of mechanical damage of the optical component 1030 as a result.

Figure 11:
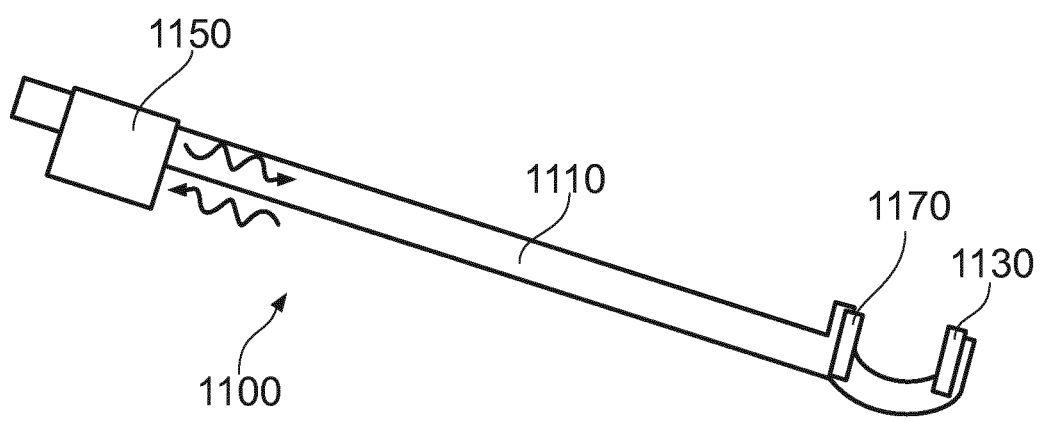
FIG. 11 is a stirring unit of a system according to an embodiment.

FIG. 11 is a stirring unit of a system according to an embodiment. As shown in FIG. 11, the stirring unit 1100 is implemented as a stirring spoon to be used in the system. The system further comprises a near-infrared light source, a sensor, and a control unit, which are integrated as a near-infrared light module 1150 positioned at a first end of the stirring unit 1100, and an optical component 1170. Although not shown in FIG. 11, the system further comprises a food processing apparatus, which in turns comprises a food processing chamber, a food processing unit, and an optical component.

The stirring unit 1100 further comprises a light guiding portion 1110 configured to guide light from the near-infrared light source of the near-infrared light module 1150 to the food stuff received in the food processing chamber of the food processing apparatus, and to guide reflected light to the sensor of the near-infrared light module 1150. Accordingly, during operation of the stirring unit 1110 when at least a portion of it is placed inside the food processing chamber of the food processing apparatus, emitted near-infrared light from the near-infrared light source may be guided through the light guiding portion 1110 from the first end of the stirring unit 1100 towards a second end of the stirring unit 1100 and into the food stuff received in the food processing chamber. In some embodiments, emitted near-infrared light from the near-infrared light source may exit the stirring unit 1110 through the optical component 1170. The optical component 1170 may comprise a protective layer which serves to protect against abrasion as well as discoloration of a part of the stirring unit and the optical component 1170 itself.

Subsequently, the near-infrared light is reflected at the optical component 1130 and again through the food stuff, the light guiding portion 1110, and reaching the near-infrared light module 1150 to be measured by the sensor in the near-infrared light module 1150 Since the near-infrared light source and the sensor are provided at the stirring unit 1100 in this embodiment, there is no need to provide these components at the food processing apparatus. The stirring unit 1100 can therefore be used with any food processing apparatus that comprises an optical component, such as those described in the embodiments above.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A food processing apparatus for use with a near-infrared light source and a sensor, the food processing apparatus comprising:
   a food processing chamber configured to receive a food stuff;
   a channel formed at a base of the food processing chamber;
   a food processing unit configured to process the food stuff and to generate a flow of the food stuff in the food processing chamber, such that at least a portion of the food stuff flows through the channel during operation; and
   an optical component configured to reflect near-infrared light emitted from the near-infrared light source through the channel towards the sensor, wherein the optical component is arranged at a first side wall of the channel.

2. The food processing apparatus according to claim 1, wherein the channel is formed by a recess at the base of the food processing chamber.

3. The food processing apparatus according to claim 1, further comprising:
   a protective element arranged at a second side wall of the channel, wherein the second side wall is opposite to the first side wall and a position of the protective element corresponds to a position of the optical component at the first side wall.

4. The food processing apparatus according to claim 3, wherein the protective element and the optical component are formed as a single integral unit.

5. The food processing apparatus according to claim 3, wherein the optical component is a first optical component, and the food processing apparatus further comprises a second optical component, wherein the second optical component is arranged at the second side wall of the channel, and the first side wall of the channel is configured such that incoming light from the near-infrared light source is reflected at the first optical component towards the second optical component, and incoming light from the second optical component is reflected towards the sensor.

6. The food processing apparatus according to claim 1, wherein the channel has a length and a cross-sectional area that increases along the length in a direction along the flow generated by the food processing unit during operation.

7. The food processing apparatus according to claim 1, wherein the food processing unit comprises a shaft connected to a motor and a cutting element.

8. The food processing apparatus according to claim 1, wherein the food processing unit comprises a mounting unit configured to form the channel, and wherein the optical component is arranged at the mounting unit.

9. The food processing apparatus according to claim 1, wherein the optical component comprises a mirror.

10. The food processing apparatus according to claim 1, wherein the optical component comprises a protective layer.

11. The food processing apparatus according to claim 10, wherein the protective layer comprises a hard glass.

12. A system comprising the food processing apparatus according to claim 1, the system further comprising:
    the near-infrared light source configured to emit the near-infrared light;
    the sensor configured to measure reflected near-infrared light spectrum; and
    a control unit configured to determine an amount of at least one type of macronutrient in the food stuff, based on the reflected near-infrared light spectrum.

13. The system according to claim 12, further comprising a base unit onto which the food processing chamber of the food processing apparatus is removably mounted, wherein the near-infrared light source and the sensor are integrated at the base unit.

14. The system according to claim 12, further comprising a stirring unit, wherein the near-infrared light source and the sensor are integrated at the stirring unit, and wherein the stirring unit further comprises a light guiding portion configured to guide light from the near-infrared light source to the food stuff received in the food processing chamber, and to guide reflected light to the sensor.

15. The food processing apparatus according to claim 1, wherein the channel is formed by a portion of an inner surface of the food processing chamber and a protruding portion extending from the base of the food processing chamber.

16. The food processing apparatus according to claim 15, wherein the protruding portion comprises the first side wall of the channel on which the optical component is arranged.

17. The food processing apparatus according to claim 15, wherein the protruding portion has a curved shape that corresponds to a shape of the portion of the inner surface of the food processing chamber.

* * * * *